G. B. M. GRAY.
GEAR SHIFT LOCK.
APPLICATION FILED SEPT. 25, 1920.
1,422,353.
Patented July 11, 1922.
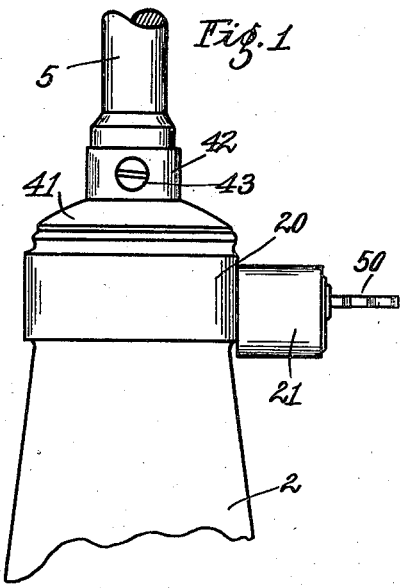
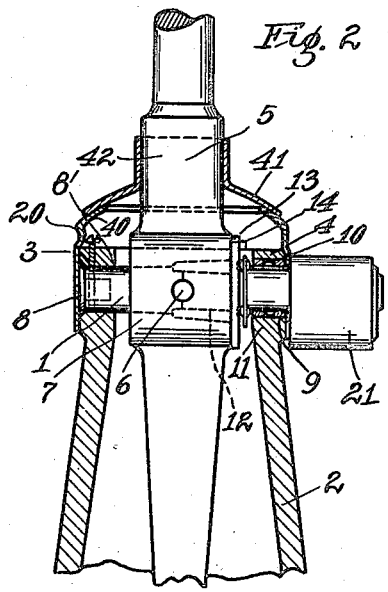
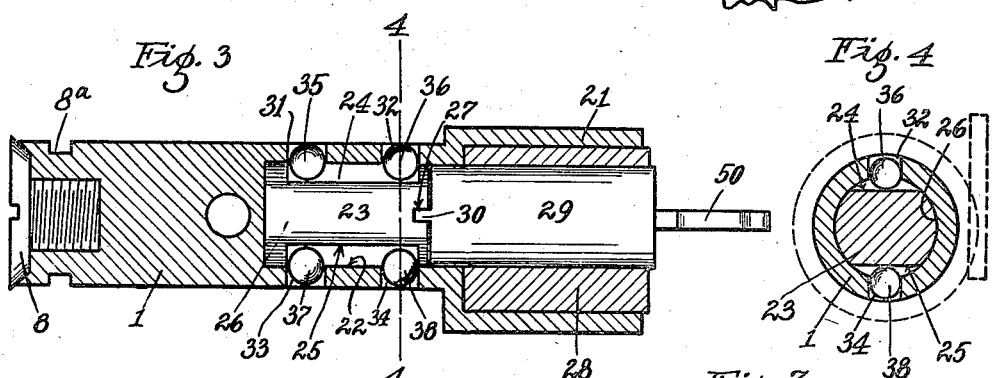
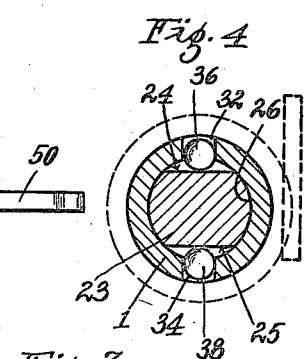
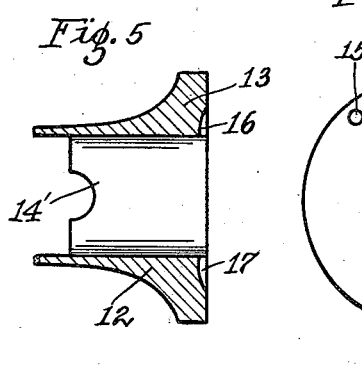
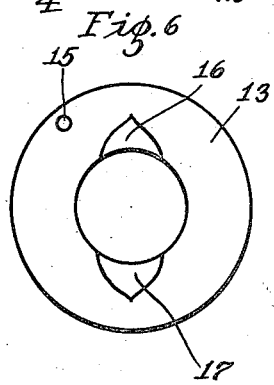
Inventor
George B. M. Gray
By Harry C. Schwedke
Attorney

UNITED STATES PATENT OFFICE.

GEORGE B. M. GRAY, OF OAKLAND, CALIFORNIA.

GEAR-SHIFT LOCK.

1,422,353. Specification of Letters Patent. Patented July 11, 1922.

Application filed September 25, 1920. Serial No. 412,761.

*To all whom it may concern:*

Be it known that I, GEORGE B. M. GRAY, a citizen of the United States, residing at Oakland, in the county of Alameda and State of California, have invented certain new and useful Improvements in Gear-Shift Locks, of which the following is a specification.

My invention is an improved gear shift lock.

Referring to the annexed drawing in which my invention is illustrated and which forms a part of this specification:

Figure 1 is a fragmentary elevation of a gear shift lever and standard with my lock applied thereto.

Figure 2 is a fragmentary view partly in section and partly in elevation of a gear shift lever and standard and my lock applied thereto.

Figure 3 is a longitudinal section of my lock.

Figure 4 is a cross section of my lock taken on line 4—4 of Figure 3.

Figure 5 is a longitudinal section of one of the sleeve lock members.

Figure 6 is an end view of said sleeve lock member.

Figure 7 is a longitudinal section of the lock bushing.

A shaft 1 is journaled in the upper end of the hollow gear shift standard 2 in bearings 3 and 4 in said standard. The gear shift lever 5 is secured on the shaft 1 by a pin 6 and extends through the standard 2, an enlargement 7 being formed on the lever through which the shaft 1 extends, the pin 6 extending through said enlargement and the shaft. A screw 8 screws into one end of shaft 1, the head of which is countersunk in the outer end of the bearing 3. A screw 8' passes through the bearing 3 into an annular groove 8ª to prevent any end motion in the shaft 1. The shaft 1 is journaled in a bushing 9 in the bearing 4, said bushing being provided with two openings 10 and 11 arranged opposite each other in the upper and lower walls thereof. A conical sleeve 12 fits on the shaft 1 within the lever enlargement 7, an external flange 13 being formed on the outer end of the sleeve, which flange fits against the end of the enlargement 7 adjacent the bearing 4. A pin 14 extends through an aperture 15 in the flange 13 into the end of the enlargement 7 and secures the sleeve 12 to the lever 5 so that it cannot turn with relation to the lever, and forces the flange to return to the locking position. The pin 6 is adapted to pass through recess 14' in the sleeve 12. The flange 13 has a pair of depressions 16 and 17 arranged opposite each other in the inner edge of its outer surface. A sleeve 20 fits over the upper end of the standard 2 and the bearings 3 and 4, the shaft 1 extending through one side of said sleeve. A lock casing 21 is formed on the end of the shaft 1 outside the sleeve 20 and the bearing 4, the inner end of said casing fitting against said sleeve. A bore 22 is provided in the shaft 1 extending from the inner end of the lock casing 21, in which bore is turnably mounted a cylindrical cam 23 formed with oppositely disposed cam surfaces 24 and 25 below its cylindrical surface 26, which fits the surface of the bore. In the outer end of the cam 23 is a diametrical groove 27. A lock, such as a commercial lock 28 is mounted in the lock casing 21, the tumbler 29 of which has a tongue 30 which fits in the cam groove 27. The shaft 1 is provided with four openings 31, 32, 33 and 34 communicating with the bore 22, in which openings fit balls 35, 36, 37 and 38 respectively, said balls normally resting within the shaft in the bore 22 with the balls 35 and 36 resting on the cam surfaces 24 and the balls 37 and 38 resting on the cam surfaces 25 when the lever 5 is unlocked. The openings 31 and 33 register with the openings 10 and 11 in bushing 9 when the lever is in neutral position. The sleeve 20 has an upper spherically shaped internal flange 40 upon which rests a spherically curved cap 41 on a sleeve 42 secured to the lever 5 by a screw 43.

The lever 5 is locked in neutral position by inserting the key 50 in the lock 28 and turning it so that the tumbler tongue 30 engaging cam groove 27 turns said cam until its high cylindrical surface 26 engages and forces the balls 35, 36, 37 and 38 outwardly through the openings 31, 32, 33 and 34 respectively into the openings 16, 17, 10 and 11 respectively. The engagement of the balls 36 and 37 with the openings 32 and 10 and the openings 34 and 11 respectively, lock the lever 5 against turning. The engagement of the balls 35 and 37 with the opening 31 and groove 16 and with the opening 33 and groove 17 hold the lever tightly on the shaft 1 against movement sidewise.

Having described my invention, I claim:

1. In combination, a standard, a shaft journaled in the upper end of said standard, a gear shift lever secured on said shaft, a lock mounted on the outer end of said shaft, said shaft having a bore and openings communicating with said bore, a bushing in said standard through which said shaft extends, said bushing being provided with openings adapted to register with the openings in said shaft when the lever is in neutral position, balls in said shaft fitting in the openings therein, a cam in said bore actuated by said lock for forcing said balls outwardly so that they rest partly in the openings in said shaft and partly in the openings in said bushing to lock the lever in neutral position, other openings in said shaft communicating with said bore, a sleeve fitting said shaft in said lever, and secured to said lever, a flange on the end of said sleeve engaging the outside of said lever, said sleeve being provided with depressions registering with said other openings, and balls resting in said other openings in said shaft out of said depressions adapted to be forced outwardly by said cam partly in said openings and partly in said depressions when the cam is actuated by said lock to lock the lever in neutral position.

2. In combination, a standard, a shaft journaled in the upper end of said standard, a gear shift lever secured on said shaft, a lock mounted on the outer end of said shaft, said shaft having a bore and openings communicating with said bore, a cam in said bore actuated by said lock, means actuated by said cam to lock the lever in neutral position, said shaft being provided with openings communicating with said bore, a sleeve fitting on said shaft in said lever and secured to said lever, a flange on the end of said sleeve engaging the outside of said lever, said sleeve being provided with depressions registering with said openings in said shaft, and balls resting in said openings out of said depressions adapted to be forced outwardly by said cam partly into said depressions and partly in said openings when the cam is actuated by the lock to cause said locking means to lock the lever in neutral position.

In testimony whereof I affix my signature.

GEORGE B. M. GRAY.